United States Patent
Lazarowicz et al.

(10) Patent No.: US 8,132,734 B2
(45) Date of Patent: Mar. 13, 2012

(54) FINANCIAL TRANSACTION CARD WITH STORAGE CHAMBER

(75) Inventors: Karie Lazarowicz, Minneapolis, MN (US); Lizbeth Otremba, Minneapolis, MN (US); Erin M. Borkowski, Andover, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 1404 days.

(21) Appl. No.: 11/592,760

(22) Filed: Nov. 3, 2006

(65) Prior Publication Data

US 2008/0109350 A1  May 8, 2008

(51) Int. Cl.
   *G06K 19/00* (2006.01)
(52) U.S. Cl. .......... 235/487; 235/380; 235/462.01; 235/494; 235/492; 705/39
(58) Field of Classification Search .......... 235/462.01, 235/487, 492, 494, 380; 705/39
   See application file for complete search history.

(56) References Cited

U.S. PATENT DOCUMENTS

| | | | |
|---|---|---|---|
| D162,422 S | 3/1951 | Kitzes | |
| D248,892 S | 8/1978 | Pfleger | |
| D260,325 S | 8/1981 | Davis | |
| 4,402,398 A | 9/1983 | Smoczynski | |
| 4,921,094 A | 5/1990 | van den Akken | |
| 5,080,223 A * | 1/1992 | Mitsuyama | 206/39.5 |
| D343,951 S | 2/1994 | Petty et al. | |
| D351,320 S | 10/1994 | Minor | |
| 5,358,019 A | 10/1994 | Sumner, III | |
| 5,520,230 A | 5/1996 | Sumner, III | |
| 6,108,957 A | 8/2000 | Zapawa | |
| 6,123,240 A * | 9/2000 | Fowles et al. | 224/600 |
| 6,349,829 B1 * | 2/2002 | Matheis et al. | 206/449 |
| 6,460,696 B1 | 10/2002 | Meyer | |
| D481,866 S | 11/2003 | Lawrence, Sr. | |
| 6,681,972 B1 * | 1/2004 | Tapocik | 224/602 |
| 6,848,207 B1 * | 2/2005 | Powell | 40/661 |
| D517,810 S | 3/2006 | Golden et al. | |
| 2002/0143697 A1 | 10/2002 | Gotfried | |
| 2003/0028439 A1 * | 2/2003 | Cox et al. | 705/26 |
| 2003/0225623 A1 * | 12/2003 | Wankmueller | 705/17 |
| 2004/0182940 A1 | 9/2004 | Biller | |

(Continued)

FOREIGN PATENT DOCUMENTS

CH 670746 4/1989

(Continued)

OTHER PUBLICATIONS

Halbur, Ted C. et al., "Stored-Value Card with Finger Puppet," U.S. Appl. No. 11/542,553, filed Oct. 3, 2006.

*Primary Examiner* — Ali Sharifzada
(74) *Attorney, Agent, or Firm* — Griffiths & Seaton PLLC

(57) ABSTRACT

A financial transaction card includes a housing and an account identifier. The housing includes a soft and pliable material and defines a chamber configured to maintain at least one item. The account identifier is disposed on an exterior surface of the housing. The account identifier is configured to link the housing to a financial account or a financial record. Other embodiments of financial transaction cards, financial transaction card assemblies, and associated methods are also disclosed.

28 Claims, 14 Drawing Sheets

U.S. PATENT DOCUMENTS

| | | | |
|---|---|---|---|
| 2004/0237360 A1* | 12/2004 | Nelms et al. | 40/124.04 |
| 2005/0061889 A1 | 3/2005 | McGee et al. | |
| 2006/0060274 A1 | 3/2006 | Duffy | |
| 2006/0064906 A1 | 3/2006 | Flemons | |
| 2006/0118618 A1* | 6/2006 | Schultz et al. | 235/380 |
| 2006/0157554 A1 | 7/2006 | Halbur et al. | |
| 2006/0231609 A1* | 10/2006 | Lazarowicz et al. | 235/380 |
| 2006/0243609 A1* | 11/2006 | Cole et al. | 206/232 |
| 2007/0267313 A1 | 11/2007 | McLean | |

FOREIGN PATENT DOCUMENTS

GB 2277482 A 11/1994

* cited by examiner

FINANCIAL TRANSACTION CARD WITH STORAGE CHAMBER

BACKGROUND OF THE INVENTION

Stored-value cards and other financial transaction cards come in many forms. A gift card, for example, is a type of stored-value card that includes pre-loaded or selectively loaded monetary value. In one example, a customer buys a gift card having a specified value for presentation as a gift to another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Stored-value cards provide a number of advantages to both the consumer and the retailer.

SUMMARY OF THE INVENTION

One aspect of the present invention is related to a financial transaction card including a housing and an account identifier. The housing includes a soft and pliable material and defines a chamber configured to maintain at least one item. The account identifier is disposed on an exterior surface of the housing. The account identifier is configured to link the housing to a financial account or a financial record. Other related products and methods are also disclosed and provide additional advantages.

BRIEF DESCRIPTION OF THE DRAWINGS

Embodiments of the invention will be described with respect to the figures, in which like references numerals denote like elements, and in which.

DETAILED DESCRIPTION

Figure 1:
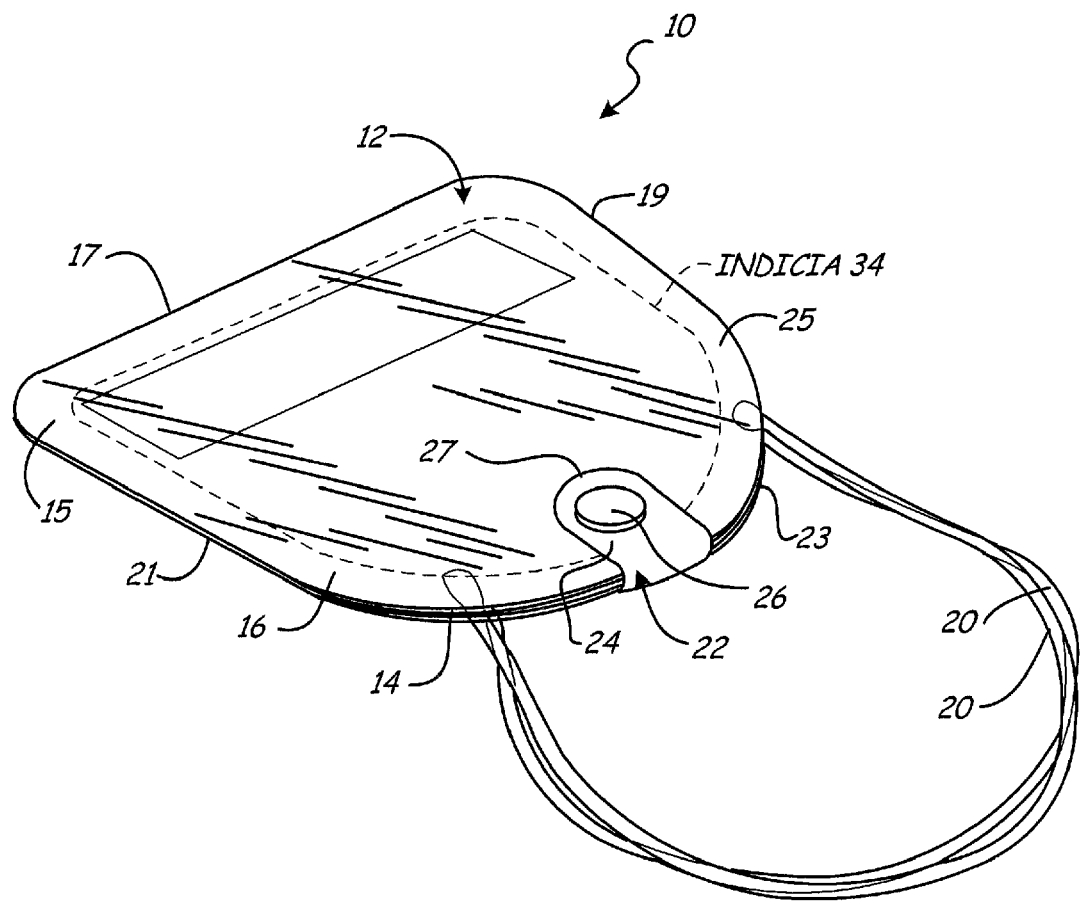
FIG. 1 is a front perspective view illustrating one embodiment of the stored-value card, according to the present invention.

A gift card or other stored-value card is adapted for making purchases of goods and/or services at, e.g., a retail store or website. According to one embodiment, an original consumer buys a stored-value card to give a recipient who in turn is able to use the stored-value card at a retail store or setting to pay for the goods and/or services. A stored-value card, according to embodiments of the present invention, provides the consumer and recipient with extra amusement and/or functionality in addition to the ability to pay for goods and/or services with the store-value card.

In particular, the stored-value card presents the original consumer or a recipient with receptacle, which, in one embodiment, is adapted for use as a coin purse. During use, the coin purse can be used to house readily removable item(s) such as coins, bills, toys, trinkets, etc., thereby providing the consumer or recipient with a dual purpose product. In one embodiment, the additional functional aspects of the stored-value card promotes the sale and/or loading of the store-value card by potential consumers and/or bearers of the stored-value card.

Turning to the figures, FIGS. 1-7 illustrate various views of one embodiment of a stored-value card 10, according to the present invention. The stored-value card 10 includes a housing or enclosure 12 (i.e., a first portion). The housing 12 is configured to allow containment of readily removable item(s), which are generally indicated at 13 in FIG. 2 only for illustrative purposes. In one embodiment, the housing 12 includes at least a back side 14 and a front side 16. Back side 14 and front side 16 are connected to one another to form a containment space 18 (FIG. 5), for example a storage chamber or cavity, for holding and enclosing the readily removable item(s) 13.

In one example, the back side 14 and the front side 16 are each formed with a similar size and shape. In one embodiment, the back side 14 and the front side 16 are formed of a single piece of material 15 manipulated to form the containment space 18. For example, the single piece of material 15 is folded substantially in half along a bottom edge 17 of the housing 12 to define the back side 14 and the front side 16, and at least a portion of the back side 14 and the front side 16 are sealed, adhered, welded, sewn, or otherwise coupled together along opposite side edges 19 and 21 to define the containment space 18 therebetween. In one embodiment, the back and front sides 14 and 16 are formed of separate pieces or members and are secured to one another about a portion of the perimeters thereof. More specifically, in one embodiment, the back and front sides 14 and 16 are defined by separate members that are sealed or otherwise joined together along at least a portion of the perimeter of, such as along at least a portion of each of three adjacent edges of, the housing 12 to form the containment space 18.

Figure 2:
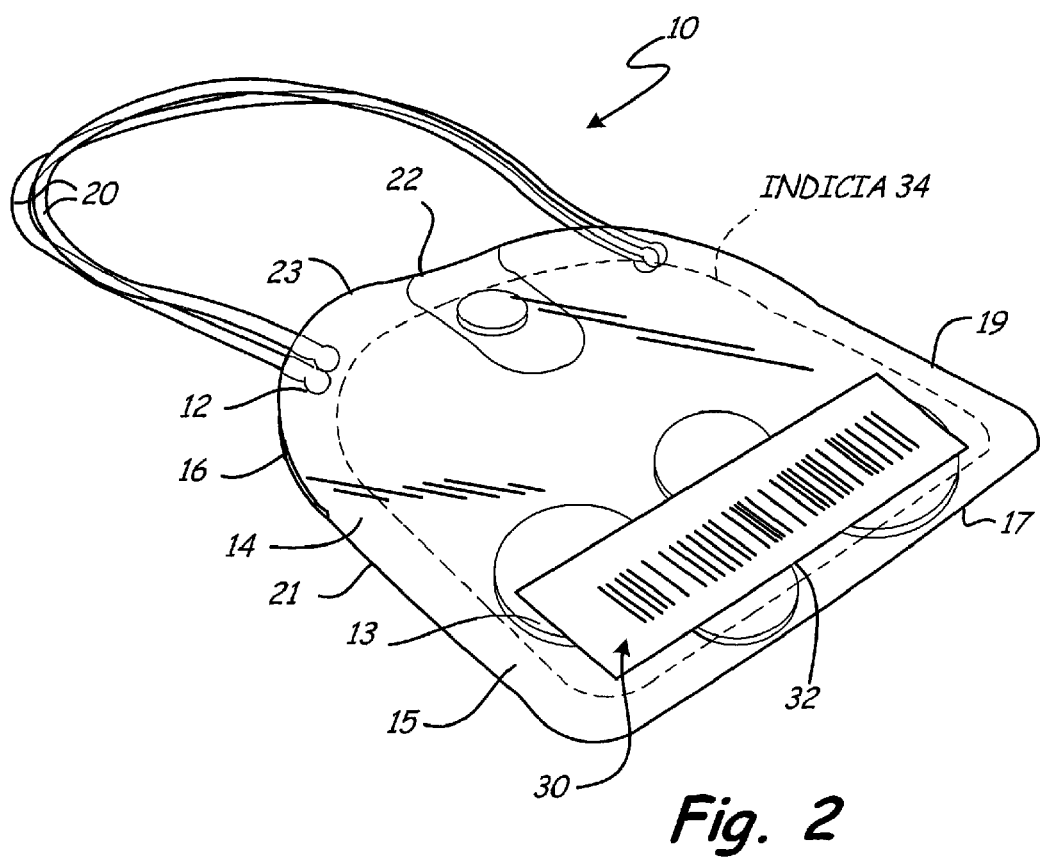
FIG. 2 is a back perspective view illustrating one embodiment of the stored-value card of FIG. 1, according to the present invention.
Figure 3:
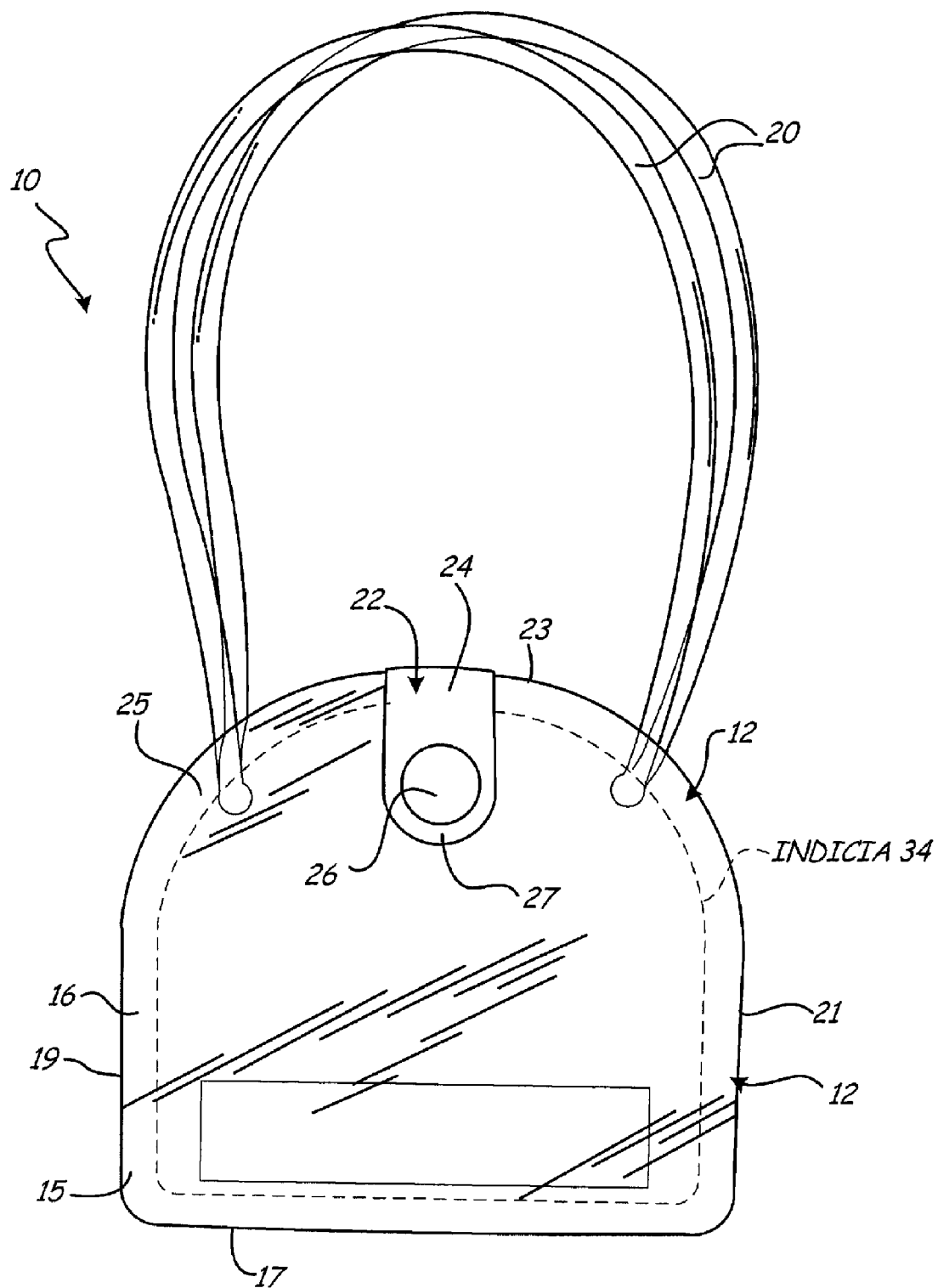
FIG. 3 is a front view illustrating one embodiment of the stored-value card of FIG. 1, according to the present invention.

In one embodiment, the housing 12 has more than two sides that are connected in any suitable manner to form the containment space 18 therebetween. In one embodiment, the housing 12 is a coin purse or other enclosure configured to selectively house item(s) 13 (FIG. 2). In one example, the housing 12 is made from a soft and pliable or soft and flexible material 15 such as soft plastic, leather, and pliable fabrics. As used herein, "pliable" materials are supple enough to be bent and/or folded freely and repeatedly without creases, cracks, or breaks. In one embodiment, the pliable or flexible material is configured to deform to accommodate a thickness of item(s) 13 when they are placed within containment space 18. For instance, in one example, the housing 12 is substantially flat when no item(s) 13 are contained within the containment space and is sufficiently supple to deform to increase an overall thickness of the housing 12 when item(s) 13 are placed within the containment space 18 to accommodate a thickness of item(s) 13. In one example, the housing 12 is sufficiently pliable so as to be folded onto itself by a bearer of the housing 12.

In one embodiment, the pliable material 15, and therefore, the housing 12 is translucent or transparent. As such, in one embodiment, the item(s) 13 are visible when stored within the containment space 18. In one embodiment, the pliable material 15 includes suspended and scattered particles such as glitter or other suitable particles.

In one embodiment, straps 20 (or strips of material) are attached to the housing 12 to facilitate hanging or carrying the housing 12. In one embodiment, straps 20 are elongated and each end of the straps 20 are sealed, adhered, welded, sewn, or otherwise coupled to the housing 12. More particularly, one strap 20 is coupled with the back side 14 and another strap 20 is coupled with the front side 16 relatively near a top opening 23 of the housing 12. In one embodiment, the straps 20 are coupled to the housing 12 within the containment space 18 (FIG. 5) and extend out of the housing 12 therefrom. The straps 20 can be of any desired length such as a length sufficient to facilitate carrying the housing 12. In one embodiment, the straps 20 are made from a pliable plastic, leather, pliable fabrics, wood, metal, or other suitable material and, in one example, are one of translucent or transparent.

In one embodiment, a closure 22 is attached to the housing 12 and is configured to selectively close the containment space 18, thereby maintaining the housing 12 in a closed position. In one example, the closure 22 includes a flap 24 extending from the back side 14 of the housing 12 to interface with the front side 16 of the housing 12. As illustrated in FIGS. 1-7, in one embodiment, the flap 24 is substantially small in width as compared to the housing 12 or even as compared to the top opening 23 of the housing 12. In one example, the flap 24 is formed of a pliable material such as a material similar to the material 15 forming the housing 12. The flap 24 is configured to extend from the back side 14 of the housing 12 and to be folded or bent over the front side 16 of the housing 12 to interact with a front surface 25 thereof. More specifically, the pliable material forming the flap 24 is configured to be selectively and repeatedly folded over and upon itself as desired by the bearer of the housing 12 to interact with the front surface 24 of the housing 12, thereby, allowing the flap 24 to be repeatedly transitioned between an open and closed position (see FIG. 12A in view of FIG. 12B).

As such, the closure 22 is one example of means for selectively securing the housing 12 in a closed position.

In one embodiment, the extended end 27 of the flap 24 (i.e., the end 27 opposite the back side 14) is coupled with a female disc 26 which can be fitted on a male disc 28 (FIGS. 5 and 12A) coupled to the housing 12 and located on the front side 16. The female disc 26 and the male disc 28 are configured to be selectively and repeatedly coupled with one another by friction fit, snap fit, or in any other suitable manner. In one embodiment, discs 26 and 28 collectively form a snap-like coupling or fastener to maintain the flap 24 coupled with the front side 16, thereby selectively maintaining the containment space 18 (FIG. 5) in a closed configuration and securing the readily removable item(s) 13 (FIG. 2) within the containment space 18. Other methods for securing flap 24 in a closed position are also contemplated such as a loop or slot (not shown) on the front side 16 for receiving the flap 24, a magnetic connection (not shown), hook and loop materials (not shown), etc.

Figure 4:
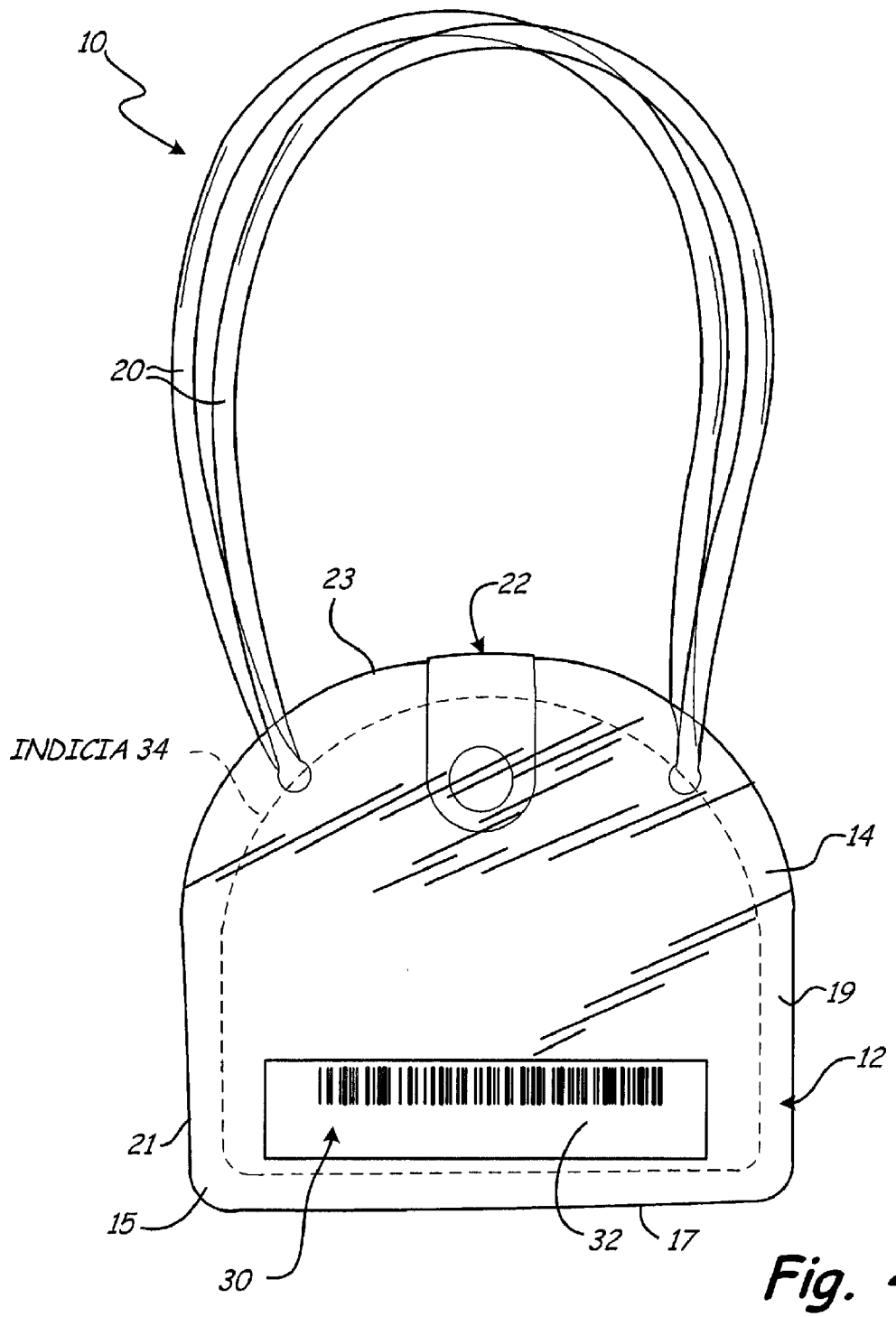
FIG. 4 is a back view illustrating one embodiment of the stored-value card of FIG. 1, according to the present invention.
Figure 5:
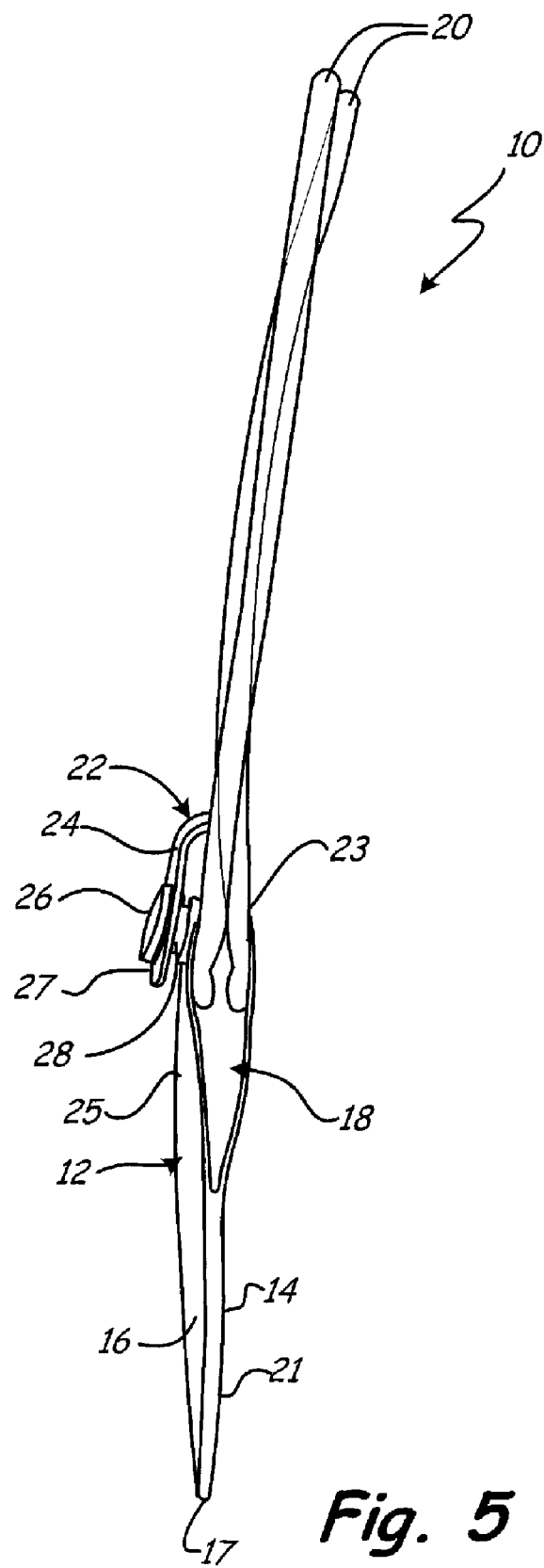
FIG. 5 is a side view illustrating one embodiment of the stored-value card of FIG. 1, according to the present invention.
Figure 6:
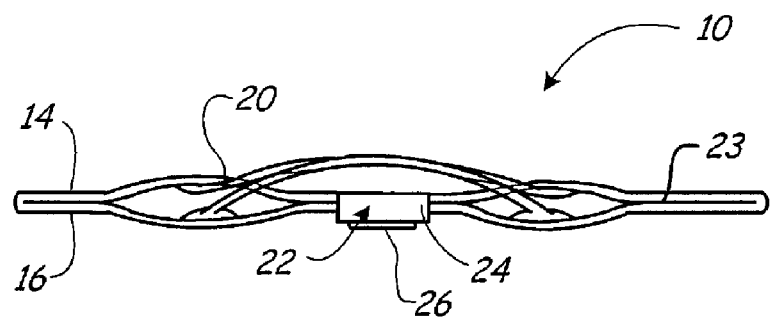
FIG. 6 is a top view illustrating one embodiment of the stored-value card of FIG. 1, according to the present invention.
Figure 7:
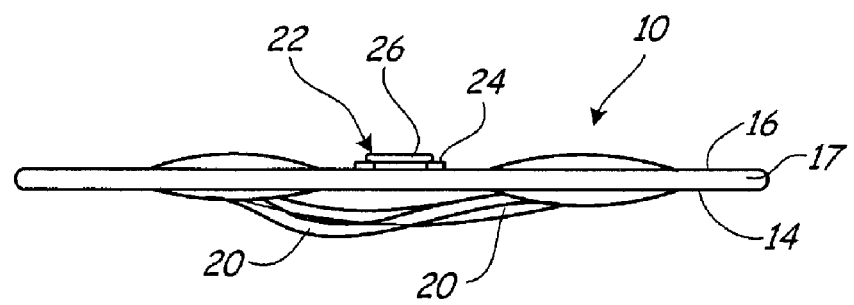
FIG. 7 is a bottom view illustrating one embodiment of the stored-value card of FIG. 1, according to the present invention.

Referring to FIGS. 2 and 4, an account identifier 30 is included on the housing 12. The account identifier 30 indicates a financial account or record to which the stored-value card 10 is linked. The account or record maintains the monetary balance on the stored-value card 10 and is optionally stored on a database, other electronic or manual record-keeping system, or in the case of "smart" cards for example, on a chip or other electronic device (not shown) on the stored-value card 10 itself. Accordingly, by scanning the account identifier 30, a financial account or record linked to the stored-value card 10 is identified and can subsequently be activated, have amounts debited therefrom, and/or have amounts added thereto. In view of the above, the account identifier 30 is one example of means for linking the stored-value card 10 with a financial account or record.

In one embodiment, the account identifier 30 is included on the back side 14 of the housing 12 of the stored-value card 10 and is in the form of a bar code, magnetic strip, smart chip or other electronic device, radio frequency identification (RFID) device, or other suitable device or marking readily readable by a point-of-sale terminal, account access station, kiosk or other suitable device. In one example, where the housing 12 member is translucent or transparent, an opaque field 32 is printed or otherwise applied to the back side 14 or the front side 16 of the housing 12 and is configured to be printed with the account identifier 30. In the case of a bar code account identifier 30, the opaque field 32 facilitates scanning of the account identifier 30.

In one embodiment, other indicia 34 are included the back side 14 and/or the front side 16 of the housing 12 and may include objects, text, backgrounds, graphics, brand identifiers, etc. In one example, indicia 34 may be translucent or opaque. In one embodiment, where the housing 12 is translucent or transparent, opaque indicia 34 are printed onto the housing 12 and are at least partially visible through a side 14 or 16 of the housing 12 opposite the side 14 or 16 on which indicia are printed. In one embodiment, the indicia 34 may include decorative items, redemption information, etc. For instance, redemption information may be included to indicate that the stored-value card 10 is redeemable for the purchase of goods and/or services, and that, upon use, a value of the purchased goods and/or services will be deducted from a financial account or record linked to the stored-value card 10. In one embodiment, the redemption information is similar to redemption information 47 of the backer 36, which is described in further detail below, and includes phrases such as "<NAME OF STORE> GiftCard" and "This GiftCard is redeemable for merchandise or services at any of our stores or at our website," and/or provides help or telephone information in a case of a lost, stolen, or damaged stored-value card, etc. In one embodiment, indicia 34 are printed or otherwise disposed on the back side 14 and/or the front side 16 of the housing 12.

Figure 8:
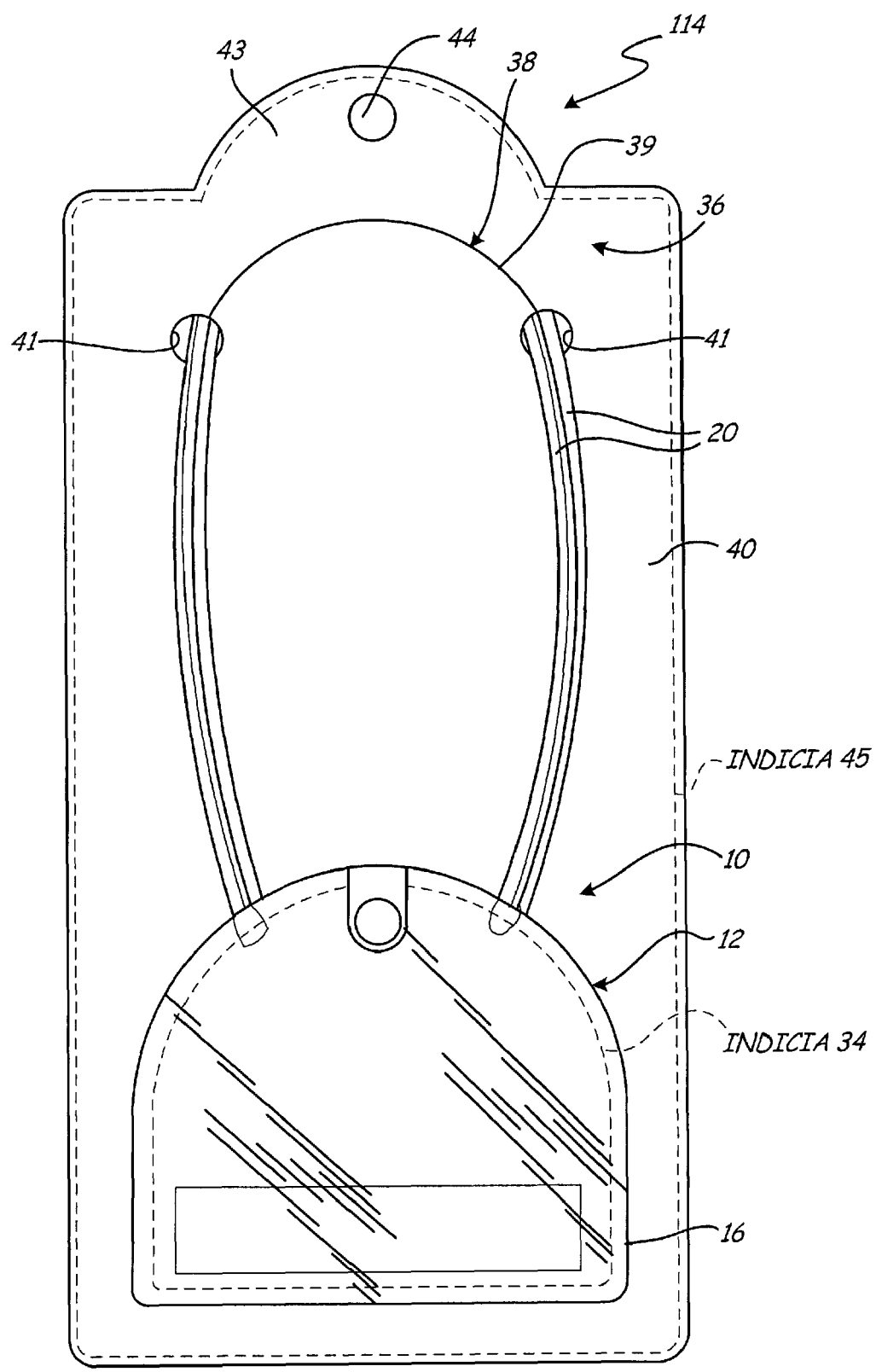
FIG. 8 is a front view illustrating one embodiment of a carrier with the stored-value card of FIG. 1, according to the present invention.
Figure 9:
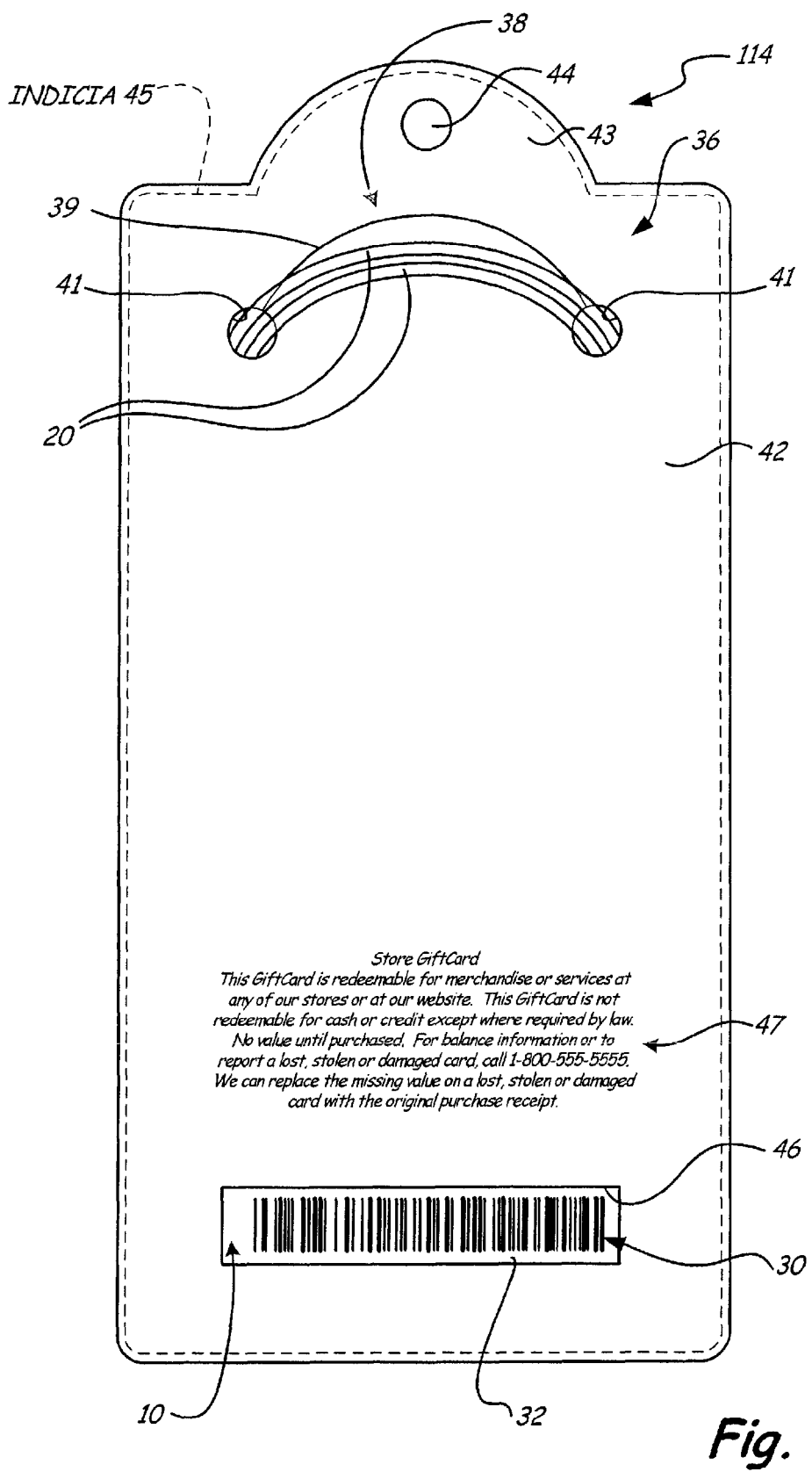
FIG. 9 is a back view illustrating the carrier with the stored-value card of FIG. 8, according to the present invention.

FIGS. 8 and 9 illustrate a carrier or backer 36 for supporting the stored-value card 10. The stored-value card 10 is readily releasably attached to the backer 36. For example, the backer 36 defines a cut-out section 38 configured to selectively receive and maintain the straps 20. More specifically, cut-out section 38 includes a slit 39 defining an upward tongue. In one embodiment, the slit 39 is curvilinear and defines an upward arching tongue. In one embodiment, an aperture 41 is defined at each end of the slit 39 to facilitate the receipt of the straps 20 as will be further described below. Alternatively or additionally, the stored-value card 10 is adhered to or coupled with the backer 36 with a releasable adhesive or in any other suitable manner.

The backer 36 includes a single layer or multiple layers of paper or plastic material, for example, generally in the form of a relatively stiff but bendable/flexible card. Other materials are also contemplated. In one embodiment, the backer 36 is generally elongated or rectangular in shape. Accordingly, the backer 36 defines a first or front surface 40 (FIG. 8) and a second or back surface 42 (FIG. 9) opposite the first surface 40. In one embodiment, a tab 43 is generally centered at a first end of the backer 36. In one example, a support arm aperture 44 is defined within the tab 43 and is configured to receive a support arm or hook (not shown). As such, the open backer 36 can be hung via aperture 44 on the support arm or hook for display in a retail setting.

In one embodiment, the first surface 40 of the backer 36 is configured to receive the housing 12 of the store-value card 10. For example, the housing 12 is selectively adhered or otherwise secured to the first surface 40 near a bottom portion of the backer 36. The straps 20 extend upwardly from the housing 12 and are received by the cut-out section 38. More specifically, the straps 20 are moved through the slit 39 such that the straps 20 extend from the first surface 40 to the back surface 42 via the slit 39. In one example, the straps 20 are seated within the two apertures 41 at the ends of the slit 39 such that the straps 20 are selectively maintained therein. In view of the above, the cut-out section 38 defines one embodiment of a means for hanging the stored-value card 10.

In one embodiment, the backer 36 defines a window or opening 46 for displaying the account identifier 30 of the stored-value card 10, as illustrated in FIG. 9. As previously described, the account identifier 30 is adapted for accessing a financial account or record associated with the stored-value card 10 and for activating, loading, or debiting from the financial account or record. Accordingly, the opening 46 allows access to the account identifier 30 to activate and/or load the stored-value card 10 without removing the stored-value card 10 from the backer 36.

In one embodiments, the backer 36 displays indicia, which is generally indicated at 45, including graphics or text information including store logo(s), store name(s), slogans, advertising, instructions, directions, brand identifiers, promotional information, media format identifiers (e.g. characters, logos, scenes, or other illustrations relating to at least one of a movie, television show, book, etc.), characters, and/or other information. In one embodiment, indicia 45 include redemption information 47, which indicate that the stored-value card 10 is redeemable for the purchase of goods and/or services and that, upon use, of value of purchased goods and/or services will be deducted from the financial account or record linked to the stored-value card 10. In one embodiment, the redemption information 47 includes phrases such as "<NAME OF STORE> GiftCard" and "This GiftCard is redeemable for merchandise or services at any of our stores or at our website" and/or provides help or phone line information in case of a lost, stolen, or damaged stored-value card 10, etc.

Figure 10:
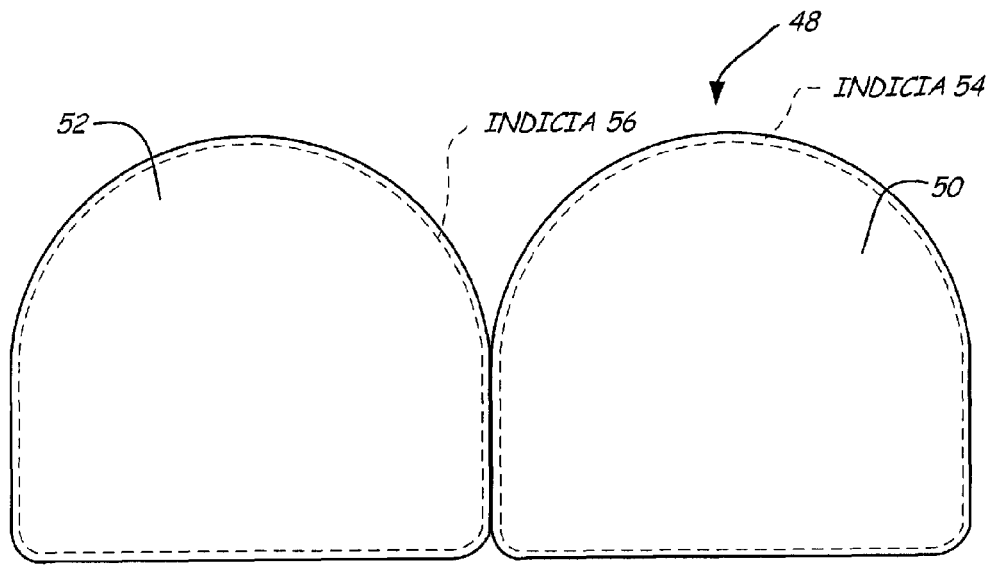
FIG. 10 is a front view illustrating one embodiment of the external surfaces of an insert, according to the present invention.
Figure 11:
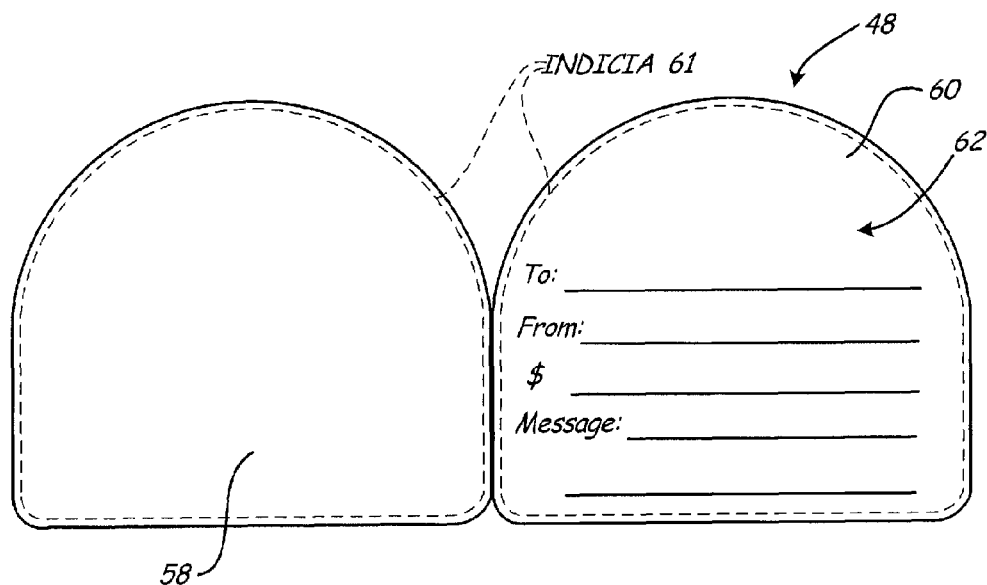
FIG. 11 is a front view illustrating one embodiment of the internal surfaces of the insert of FIG. 10, according to the present invention.

FIGS. 10 and 11 generally illustrate a greeting card or other insert that is insertable into the containment space 18 of the stored-value card 10 (FIGS. 1-7). Specifically, FIG. 10 shows a front view of the external surfaces of the greeting card 48. The greeting card 48 has a front external surface 50 and a back external surface 52. The front external surface 50 has front surface indicia generally indicated at 54, that in one embodiment, coordinates with the indicia 45 on the backer 36 and/or indicia 34 on the housing 12. Alternatively, the front surface indicia 54 can also be independent designs and not coordinate with the indicia 45 and/or 34 on the backer 36 and/or the housing 12. The back external surface 52 also contains back surface indicia generally indicated at 56, which in one embodiment, coordinates with the front surface indicia 54 and/or the indicia 45 on the backer 36. Alternatively, the back surface indicia 56 can also be independent designs and not coordinate with the front surface indicia 54 or the backer 36.

Figure 12A:
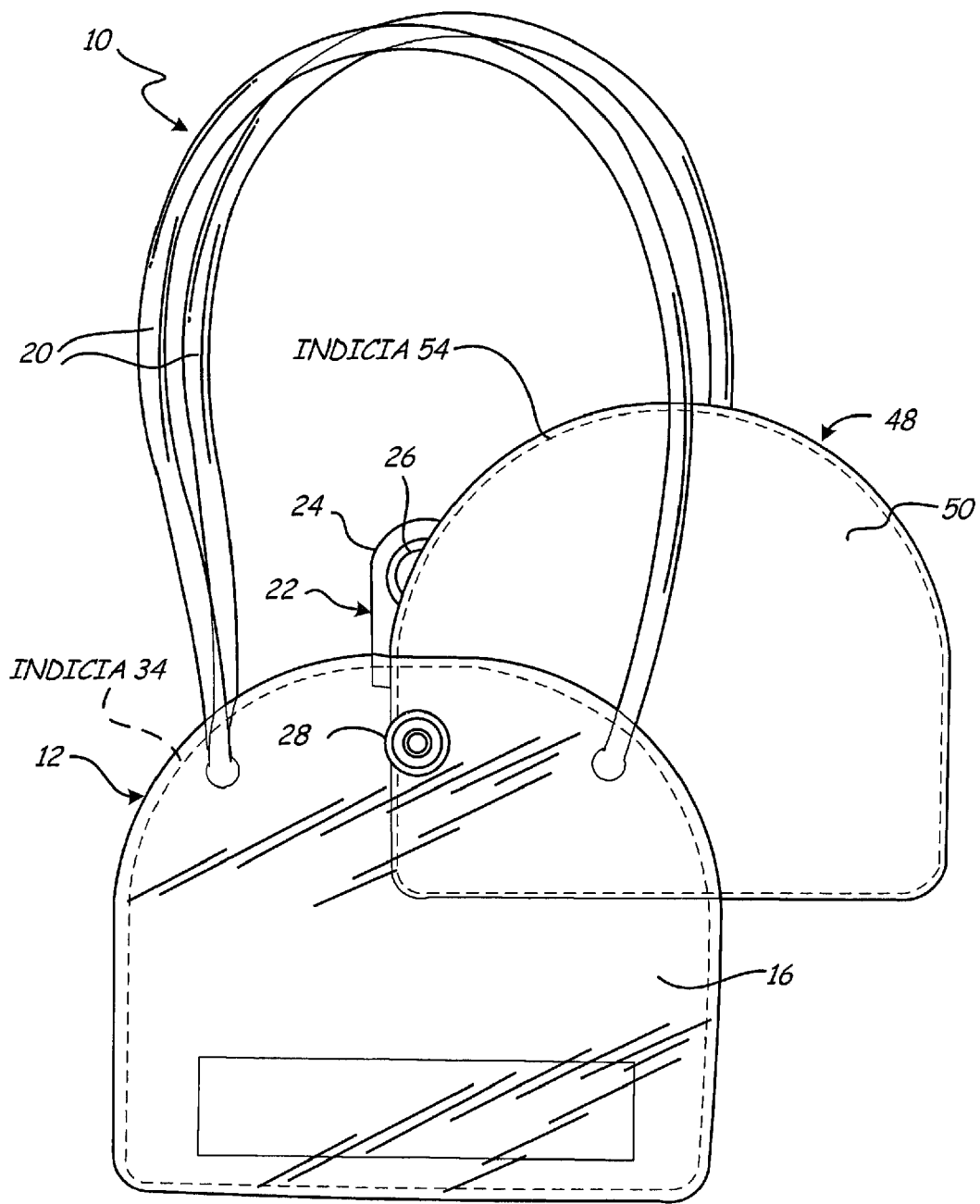
FIG. 12A is a front view illustrating one embodiment of the insert of FIGS. 10 and 11 partially inserted into the stored-value card of FIG. 1, according to the present invention.
Figure 12B:
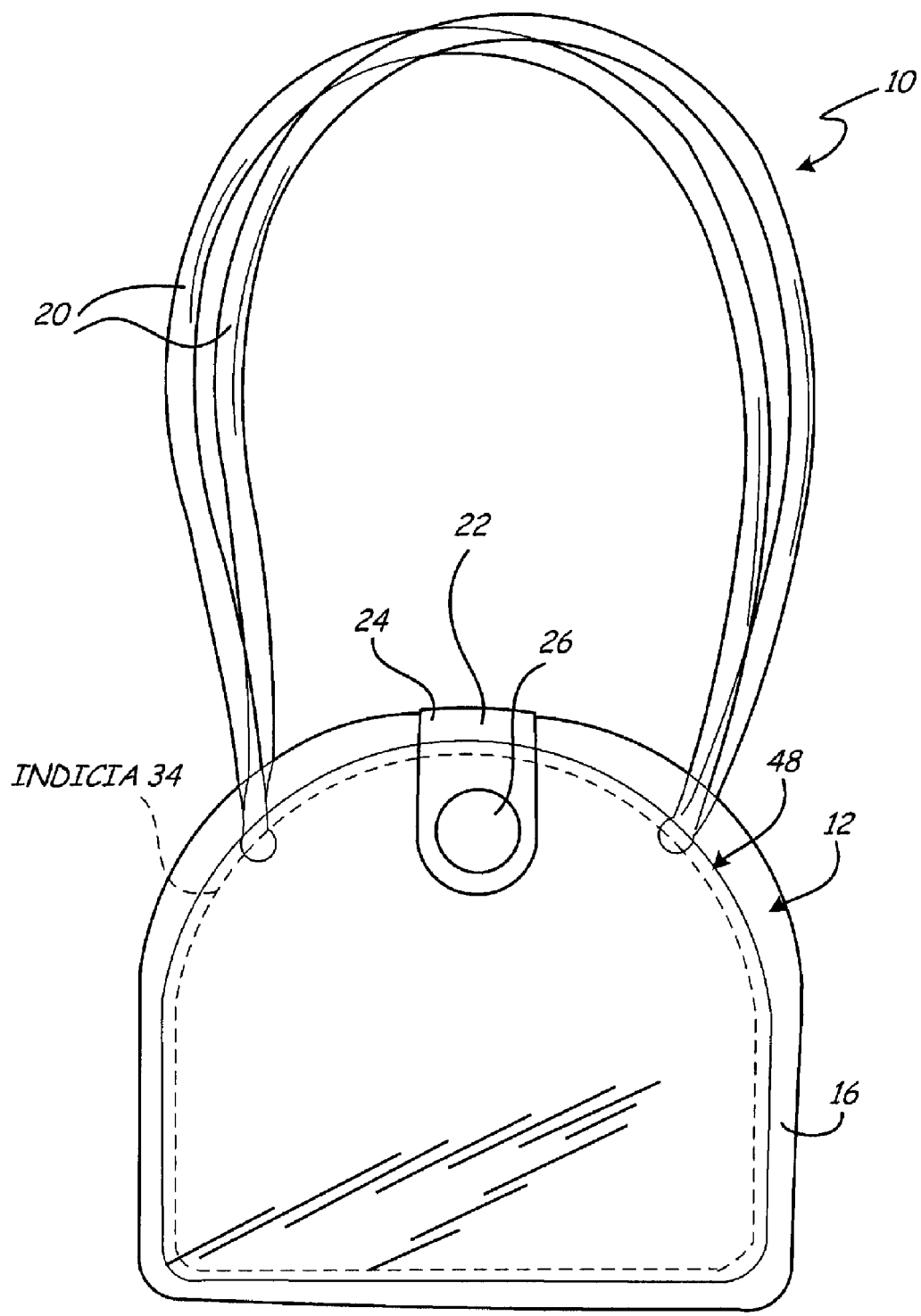
FIG. 12B is a front view illustrating one embodiment of the insert of FIGS. 10 and 11 fully inserted into the stored-value card of FIG. 1, according to the present invention.

In FIG. 11, a front view of the internal surfaces of the greeting card 48 is shown. In one embodiment, the internal surfaces of the greeting card 48 has a left internal surface 58 and a right internal surface 60. In one embodiment, both the left internal surface 58 and the right internal surface 60 contain coordinating indicia generally indicated at 61 and have writable surfaces. The right internal surface also contains a greeting section 62 where messages can be written. The greeting section 62 might also contain pre-printed text/indicia to help facilitate the drafting of messages. In one example, the preprinted text includes one or more of "To," "From," "$," "Message," or other related text where blank lines are included with the text. In one embodiment, similar preprinted text is additionally or alternatively include on one or both of the stored-value card 10 or the backer 36. In one embodiment, the greeting card 48 is folded such that internal surfaces 58 and 60 face one another and is inserted into containment space 18 of the housing 12 of the stored-value card 10 as shown in the partially inserted and fully inserted views respectfully illustrated in FIGS. 12A and 12B. As illustrated in FIG. 12B, in one embodiment, greeting card 48 is shaped similar to but slightly smaller than the containment space 18.

Figure 13:
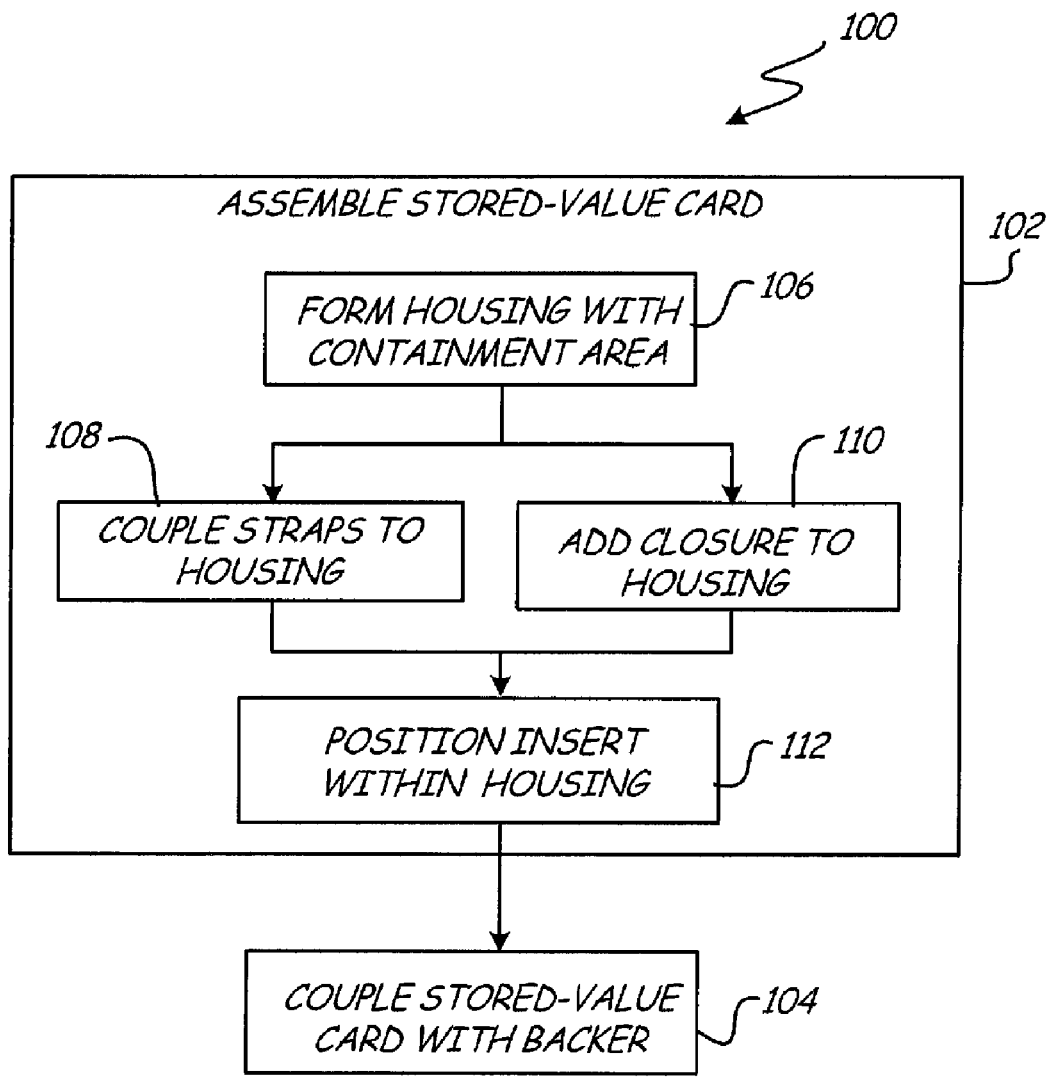
FIG. 13 is a flow chart illustrating one embodiment of a method of assembling a stored-value card, according to the present invention.

FIG. 13 is a flow chart illustrating one embodiment of a method 100 of assembling the stored-value card 10 with the backer 36. Additionally referring to FIGS. 1-7, at 102, the stored-value card 10 is assembled and, at 104, the stored-value card 10 is coupled with the backer 36. More specifically, assembling the stored-value card 10 at 102 includes forming the housing 12 with the containment space 18 (FIG. 5) at 106. The housing 12 can be formed in any suitable manner, and in one embodiment, is formed of the pliable material 15 sealed around at least a portion of the perimeter thereof to define the containment space 18.

At 108, straps 20, if any, are coupled with the housing 12. As described above, in one embodiment, coupling the straps 20 includes coupling one strap 20 to the back side 14 and one of the straps 20 to the front side 16 of the housing 12. In one embodiment, the stored-value card 10 is assembled such that straps 20 extend from the containment space 18. At 110, the closure 22, if any, is added to the housing 12. In particular, in one embodiment, the female and male discs 26 and 28 are coupled with portions of the housing 12 as described above such that the female and male discs 26 and 28 are configured to interact with one another to form a snap-like closure. In one embodiment, other closures 22 are alternatively or additionally added to the housing 12 at 110.

At 112, the greeting card or other insert 48 is positioned within the containment space 18 of the housing 12 as generally illustrated with reference to FIGS. 12A and 12B. In one example, the card 48 is substantially opaque such that the card 48 is at least partially viewable through the back side 14 and/or the front side 16 of the housing 12. In one embodiment, positioning the card 48 within the containment space 18 blocks viewing of the back side 14 from the front side 16 and vice versa as shown in comparing FIG. 12A to FIG. 12B. In one embodiment, the closure 22 is opened while card 48 is placed within the housing 12 and is closed after the card 48 is positioned within the housing 12.

Additionally referring to FIGS. 8 and 9, at 104, the assembled stored-value card 10 is coupled with the backer 36 to form a stored-value card assembly 114. In one example, the housing 12 of the stored-value card 10 is coupled to the first surface 40 of the backer 100 with an adhesive or other selectively releasable material or device such that the account identifier 30 is viewable through the opening 46 of the backer 36. In one embodiment, the stored-value card 10 is additionally or alternatively coupled to the backer 36 by placing the straps 20 of the stored-value card 10 through the slit 39 of the backer 36. The straps 20 are further maneuvered to be positioned within the apertures 41. In this manner, the stored-value card 10 is at least partially hung from the cut-out section 38 of the backer 36. Once the stored-value card 10 is assembled, the stored-value card 10 is ready for transport and/or display.

Figure 14:
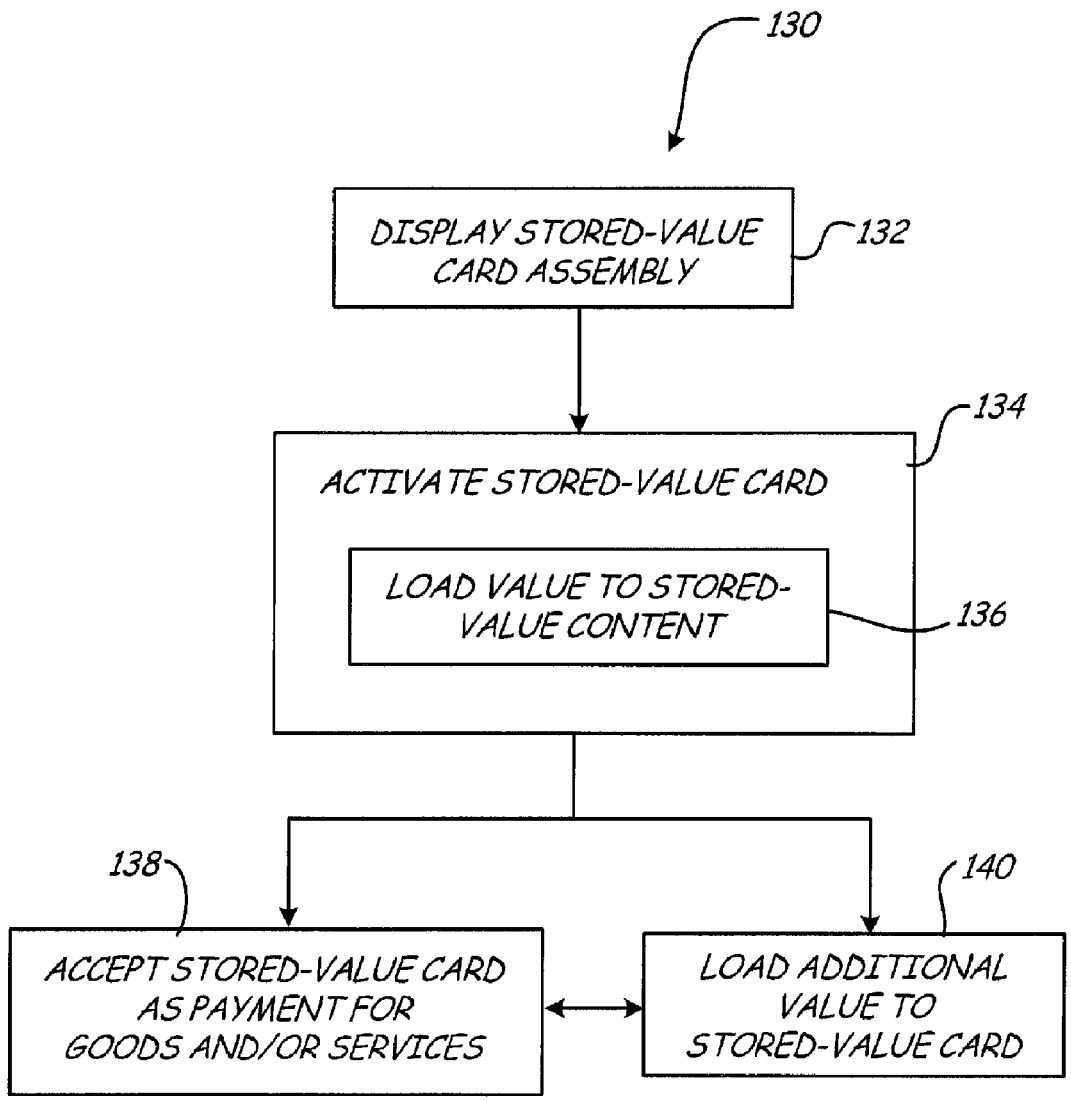
FIG. 14 is a flow chart illustrating one embodiment of a method of providing a stored-value card, according to the present invention.

FIG. 14 is a flow chart illustrating one embodiment of a method 130 of providing the stored-value card 10 with the backer 36 for sale to and for use by consumers. At 132, the stored-value card 10 with the backer 36 is placed or hung from a rack, shelf, or similar device to display the stored-value card 10 with the backer 36 for sale to potential customers. For instance, the backer 36 with the stored-value card 10 may be hung from a rack via the aperture 44 of the backer 36. In one example, the stored-value card 10 with the backer 36 is placed on a website for viewing and purchase by potential customers. In one embodiment, the stored-value card 10 is displayed without the backer 36.

At 134, a consumer who has decided to purchase the stored-value card 10 presents the stored-value card 10 with the backer 36, or at least the stored-value card 10, to a retail store employee, retail store kiosk, or other person or device to read the account identifier 30 of the stored-value card 10 to access the financial account or record linked to the account identifier 30. In one embodiment, such as where the account identifier 30 is a bar code, the account identifier 30 is accessed through the opening 46 in the backer 36. Upon accessing the financial account or record, the account or record is accessed and value is added to the financial account or record at 136. Thus, the stored-valued card 10 is activated and loaded. Once the stored-value card 10 is activated and loaded, the stored-value card 10 can be used by the consumer or any other bearer of the stored-value card 10 to purchase goods and/or services at the retail store or other affiliated retail setting or website.

At 138, the retail store or other affiliated retail setting or website accepts the stored-value card 10 as payment toward the purchase of goods and/or services made by the current bearer of the stored-value card 10. In particular, the value currently loaded on the stored-value card 10 is applied toward the purchase of goods and/or services. At 140, additional value is optionally loaded on the stored-value card 10 at a point-of-sale terminal, kiosk, or other area of the retail store or related setting. Upon accepting the stored-value card 10 as payment at 138. The store or related setting can subsequently perform either operation 138 again or operation 140 as requested by a current bearer of the stored-value card 10. Similarly, upon loading additional value to the stored-value card 10 at 140, the retail store or related setting can subsequently perform either operation 138 again or operation 140. In one example, the ability to accept the stored-value card 10 as payment for goods and/or services is limited by whether the financial account of record associated with the stored-value card 10 has any value at the time of attempted redemption.

Figure 15:
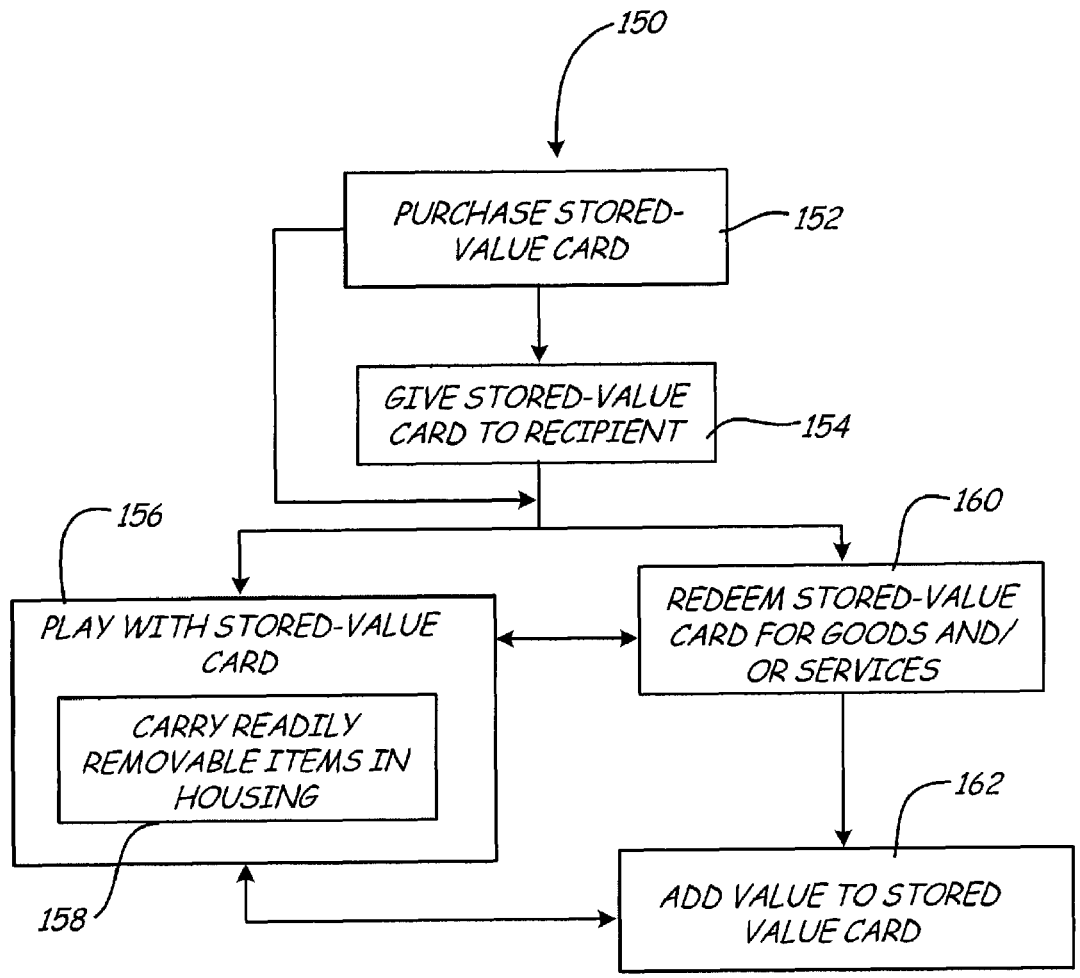
FIG. 15 is a flow chart illustrating one embodiment of a method of using a stored-value card, according to the present invention.

FIG. 15 is a flow chart illustrating one embodiment of a method 150 of using the stored-value card 10. At 152, a potential consumer of the stored-value card 10, which is displayed in a retail store or viewed on a website, decides to and does purchase the stored-value card 10 from the retail store or website setting. The stored-value card 10 can be displayed and purchased alone or as a part of the stored-value card 10 with the backer 36. Upon purchasing the stored-value card 10, a retail store employee, retail store kiosk, or other person or device scans the account identifier 30 to activate or load value onto the stored-value card 10.

At 154, the consumer optionally gives the stored-value card 10 to a recipient, such as a graduate, relative, friend, expectant parents, one having a recent or impending birthday, a couple having a recent or impending anniversary, etc. As an alternative, the consumer can keep the stored-value card 10 for his or her own use.

At 156, the consumer or recipient, whoever is in current ownership or otherwise is the current bearer of the stored-value card 10, plays with and/or uses the stored value card 10 for non-payment related purposes. More specifically, the bearer removes the stored-value card 10 from the backer 36, if the stored-value card 10 is coupled with the backer 36. The bearer opens the housing 12 and places readily removable item(s) 13 (FIG. 2) such as coins, bills, toys, or other small item(s) into the containment space 18. The bearer then has the option of securing and enclosing the item(s) in the containment space 18 by coupling the female disc 26 of the closure 22 with the male disc 28 to close the housing 12. In one embodiment, at 158, the bearer carries the stored-value card 10, and therefore, the readily removable item(s) 13 stored therein, by grasping the straps 20 attached to the housing 12.

At 162, the current bearer of the stored-value card 10 redeems the stored-value card 10 for goods and/or services from the retail store or website. At 162, the current bearer of the stored-value card 10 optionally adds value to the stored-value card 10, and more particularly, to the financial account or financial record associated with the stored-value card 10, at the retail store or over the Internet. Upon playing with the stored-value card 10 at 156, redeeming stored-value card the stored-value card 10 at 160, or adding value to the stored-value card 10 at 162, the current bearer of the stored-value card 10 subsequently can perform any operations 156, 160 or 162 as desired. In one embodiment, the ability of the current bearer to repeat redeeming the stored-value card 10 at 160 is limited by whether the financial account or record associated with the stored-value card 10 has any value at the time of attempted redemption.

Although described above as occurring at a single retail store or website, in one embodiment, purchasing the stored-value card 10 at 152, redeeming the stored-value card 10 at 160, and adding value to the store-value card 10 at 162, can each be performed at any one of a number of stores adapted to accept the stored-value card 10 or over the Internet. In one example, the number of stores are each a part of a chain of similarly branded stores. In one other example, the number of stores includes at least one website and/or at least one conventional brick and mortar store.

The stored-value card 10 comes in many forms, according to embodiments of the invention, The gift card, like other stored-value cards, can be "recharged" or "reloaded" at the direction of the original consumer, the gift recipient, or third party. The term "loading on" or "loaded on" herein should be interpreted to include adding the balance of a financial account or record associated with a stored-value card. The balance associated with a stored-value cad declines as the card is used, encouraging repeat visits. The card remains in the users possession, serving as an advertisement or reminder to revisit the associate merchant. Gift cards, according to the embodiment so the invention, provide a number of advantages to both the consumer and the merchant. Other gift cards and stored-value cards according to embodiments of the invention include loyalty cards, merchandise return cards, electronic gift certificates, employee cards, frequency cards, pre-paid cards and other types of cards associated with or representing purchasing power or monetary value, for example.

Although the invention has been described with respect to particular embodiments, such embodiments are for illustrative purposes only and should not be considered to limit the invention. Various alternatives and other modifications within the scope of the invention in its various embodiments will be apparent to those of ordinary skill in the art upon reading this disclosure.

What is claimed is:

1. A financial transaction card comprising:
a housing defining a purse including a soft and pliable material and defining a storage chamber configured to maintain at least one item; and
an account identifier disposed on an exterior surface of the housing and configured to link the financial transaction card to a financial account or a financial record, wherein the account identifier is the only information from the financial transaction card used to facilitate payment for a purchase using value from the financial account or the financial record,
wherein:
the housing is one of translucent and transparent and includes indicia on a first side of the housing,
the indicia on the first side of the housing are at least partially visible through a second side of the housing, and
the second side is positioned opposite the first side.

2. The financial transaction card of claim 1, further comprising at least one strap coupled to the housing such that the housing can be carried by a bearer of the financial transaction card grasping the strap.

3. The financial transaction card of claim 2, wherein the at least one strap is elongated and each end of the at least one strap is coupled with the housing such that the at least one strap extends outwardly from within the storage chamber.

4. A financial transaction card comprising:
a housing being a purse and including a soft and pliable material and defining a storage chamber configured to maintain at least one item;
an account identifier disposed on an exterior surface of the housing and configured to link the financial transaction card to a financial account or a financial record;
at least one strap coupled to the housing such that the housing can be carried by a bearer of the financial transaction card grasping the strap;
wherein:
the at least one strap is elongated and each end of the at least one strap is coupled with the housing such that the at least one strap extends outwardly from within the storage chamber,
the at least one strap is one of transparent and translucent,
the housing is one of translucent and transparent and includes indicia on a first side of the housing,
the indicia on the first side of the housing are at least partially visible through a second side of the housing, and
the second side is positioned opposite the first side.

5. The financial transaction card of claim 1, wherein the first side and the second side are formed of separate members coupled with one another along at least a portion of a perimeter thereof to define the storage chamber between the separate members.

6. The financial transaction card of claim 1, wherein the housing includes a closure adapted to releasably maintain the storage chamber in a closed position.

7. The financial transaction card of claim 6, wherein the housing defines an opening to the storage chamber, and further wherein the closure comprises a flap extending from the first side of the housing, across the opening of the housing, and to the second side of the housing, the second side being opposite the first side.

8. The financial transaction card of claim 7, wherein the closure further includes a fastener configured to selectively couple an end of the flap opposite the first side to the second side of the housing.

9. The financial transaction card of claim 1, further comprising a card removably maintained within the housing.

10. The financial transaction card of claim 1, in combination with a backer formed separately from the housing and defining an opening, wherein the backer is configured to support the housing, and the account identifier is accessible through the opening in the backer while the housing is coupled with and supported by the backer.

11. The financial transaction card of claim 1, wherein the indicia are substantially opaque.

12. A stored-value card comprising:
means for containing one or more items within a cavity, the means for containing comprising a purse including a housing that is one of translucent and transparent and includes indicia on a first side of the housing, the indicia on the first side of the housing are at least partially visible through a second side of the housing, and the second side is positioned opposite the first side; and
means for linking a financial account or a financial record to the means for containing such that the means for containing functions as a financial transaction card separately from any of the one or more items within the cavity; and
means for hanging the stored-value card, wherein the means for hanging the stored-value card is attached to the means for containing.

13. The stored-value card of claim 12, further comprising:
means for selectively securing the means for containing in a closed position to maintain the one or more items within the cavity.

14. The stored-value card of claim 12, wherein the means for containing is pliable.

15. A stored-value card comprising:
a first portion of the stored-value card, wherein the first portion defines a front side and a back side opposite the front side, the back side defining an exterior surface opposite the front side, and the first portion is a purse, is formed substantially entirely of a soft and pliable material, is one of translucent and transparent, and includes indicia on the front side of the first portion that are at least partially visible through the back side of the front portion;

an account identifier statically connected to the exterior surface of the back side defined by the first portion on the soft and pliable material, the account identifier being machine readable and linked to a financial account or record such that the stored-value card is configured to facilitate payment toward one or more of goods and services from the financial account or record via the account identifier; and a strap defining a first end and a second end opposite the first end, wherein the first end and the second end of the strap are each attached to the first portion such that a length of the strap extending between the first end and the second end is spaced from the first portion to allow the strap to function as a handle for the first portion.

16. The stored-value card of claim 15, wherein the strap is connected to the first portion such that the first end is spaced from the second end.

17. The stored-value card of claim 15, wherein the first portion is formed with a single piece of material.

18. The stored-value card of claim 15, wherein the account identifier is printed to the back side.

19. The stored-value card of claim 15, wherein the first portion defines a storage chamber therein for holding removable items.

20. The financial transaction card of claim 1, wherein the account identifier is disposed on the soft and pliable material of the housing.

21. The financial transaction card of claim 1, wherein the housing is entirely formed of the soft and pliable material.

22. The financial transaction card of claim 1, further comprising an internal card enclosed within the housing, the internal card is characterized by an absence of information identifying the financial account or the financial record.

23. The financial transaction card of claim 1, in combination with a backer formed separately from the housing, wherein:
the backer defines a first substantially planar surface and a second substantially planar surface opposite the first substantially planar surface,
the backer is coupled to and supports the housing on along the first substantially planar surface of the backer,
the financial transaction card further comprises at least one strap coupled to and extending away from the housing such that the housing can be carried by a bearer of the financial transaction card grasping the strap, and
the strap is coupled to the backer and partially extends along each of the first substantially planar surface and the second substantially planar surface of the backer.

24. The financial transaction card of claim 23, wherein:
the backer includes a slit spaced from the housing and extending from the first substantially planar surface to the second substantially planar surface of the backer, and
the strap extends through the slit to pass from the first substantially planar surface to the second substantially planar surface of the backer.

25. The financial transaction card of claim 1, wherein:
the housing includes opaque indicia on the first side of the housing.

26. The financial transaction card of claim 25, wherein:
an opaque field is printed to the first side of the housing, and
the account identifier is applied to the opaque field such that the account identifier is hidden from view through the housing from the second side of the housing.

27. The stored-value card of claim 15, in combination with a carrier formed separately from the stored-value card, wherein:
the carrier defines a first substantially planar surface and a second substantially planar surface opposite the first substantially planar surface,
the carrier defines a slit extending from the first substantially planar surface to the second substantially planar surface of the carrier,
the carrier is coupled to and supports the stored-value card along the first substantially planar surface of the carrier,
the strap is coupled to the carrier and extends through the slit to partially extend along each of the first substantially planar surface and the second substantially planar surface of the carrier.

28. The stored-value card of claim 15, wherein:
the first portion of the stored-value card includes opaque indicia on the exterior surface of the first portion of the stored-value card such that the opaque indicia on the exterior surface of the first portion are at least partially visible through the first portion of the stored-value card as viewed from the front side of the first portion of the stored-value card,
an opaque field is printed to the exterior surface of the first portion of the stored-value card, and
the account identifier is applied to the opaque field such that the account identifier is hidden from view from the front side of the first portion of the stored-value card through the first portion of the stored-value card.

* * * * *